(12) United States Patent
Ha et al.

(10) Patent No.: US 10,785,815 B2
(45) Date of Patent: Sep. 22, 2020

(54) ELECTRONIC APPARATUS AND CONTROLLING METHOD THEREOF

(71) Applicant: SAMSUNG ELECTRONICS CO., LTD., Suwon-si, Gyeonggi-do (KR)

(72) Inventors: Jung-su Ha, Osan-si (KR); Hyung-seoung Yoo, Anyang-si (KR); Woo-kwang Lee, Suwon-si (KR); Yu-jin Choi, Suwon-si (KR); Jae-chan Koh, Yongin-si (KR); Jee-su Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 547 days.

(21) Appl. No.: 15/188,259

(22) Filed: Jun. 21, 2016

(65) Prior Publication Data

US 2017/0064755 A1 Mar. 2, 2017

(30) Foreign Application Priority Data

Aug. 25, 2015 (KR) ........................ 10-2015-0119367

(51) Int. Cl.
*H04L 12/26* (2006.01)
*H04W 76/14* (2018.01)
*H04W 4/06* (2009.01)
*H04W 8/00* (2009.01)
*H04B 5/00* (2006.01)
*H04W 76/11* (2018.01)
*H04W 4/80* (2018.01)

(52) U.S. Cl.
CPC .......... *H04W 76/14* (2018.02); *H04B 5/0031* (2013.01); *H04W 4/06* (2013.01); *H04W 4/80* (2018.02); *H04W 8/005* (2013.01); *H04W 76/11* (2018.02)

(58) Field of Classification Search
None
See application file for complete search history.

(56) References Cited

U.S. PATENT DOCUMENTS

| | | | | |
|---|---|---|---|---|
| 9,179,254 | B1* | 11/2015 | Viswanadham | ........ H04W 4/80 |
| 2008/0273518 | A1* | 11/2008 | Pratt | ...................... G01D 21/00 370/345 |
| 2013/0107697 | A1* | 5/2013 | Chien | ................... H04W 48/14 370/217 |
| 2013/0223361 | A1* | 8/2013 | Park | ...................... H04W 12/04 370/329 |
| 2014/0357269 | A1* | 12/2014 | Zhou | ...................... H04W 76/14 455/434 |
| 2016/0350058 | A1* | 12/2016 | Zhu | ....................... G06F 3/1454 |

* cited by examiner

*Primary Examiner* — Zewdu A Beyen
(74) *Attorney, Agent, or Firm* — Staas & Halsey LLP

(57) ABSTRACT

An electronic apparatus for establishing communication between a first device and a second device is provided. According to an exemplary embodiment, the electronic apparatus includes a communicator configured to communicate with the first device; a user interface unit; and a controller configured to display identification information included in an advertising signal broadcasted from at least one device, and in response to a user command to select identification information of the second device from among at least one of the displayed identification information, control the communicator to transmit information for establishing communication between the first device and the second device to the first device.

20 Claims, 16 Drawing Sheets

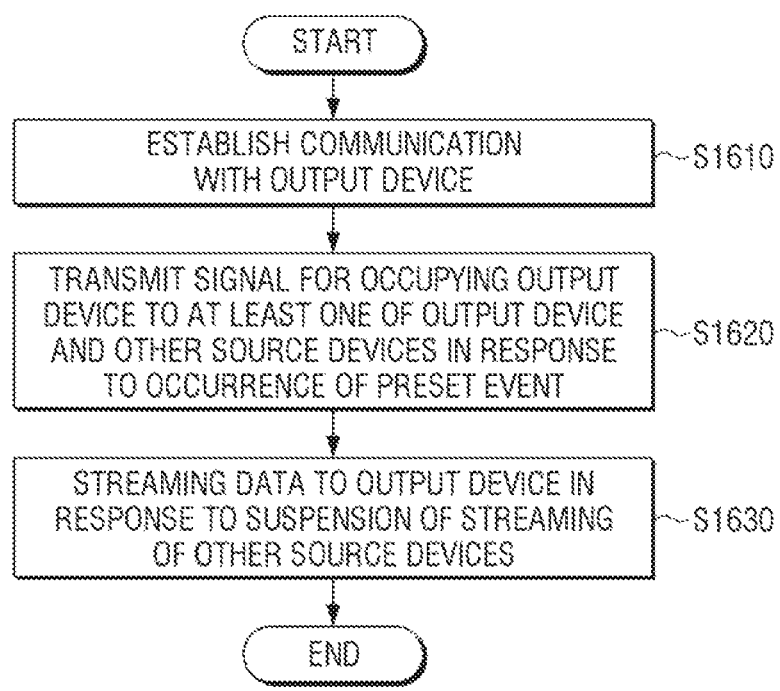

ELECTRONIC APPARATUS AND CONTROLLING METHOD THEREOF

CROSS-REFERENCE TO RELATED APPLICATIONS

This application claims priority from Korean Patent Application No. 10-2015-0119367, filed in the Korean Intellectual Property Office on Aug. 25, 2015, the disclosures of which are incorporated herein by references.

BACKGROUND

1. Field

Aspects of the exemplary embodiments relate to an electronic apparatus and a controlling method thereof, and more particularly, to an electronic apparatus which relays an establishment of communication to connect two devices and a controlling method thereof.

2. Description of the Related Art

With the development of electronic technologies, various types of objects have been able to perform communication. The objects capable of performing communication share their information with each other, and establish an Internet of Things (IoT) system for providing a user with processed information.

The conventional IoT system installed in a home network has used a centralized server in which objects are connected to a home server (in a form of a star topology).

This type of centralized home network has disadvantages that the centralized home network requires a cost for installing the home server in the home network and there is a difficulty in designing the network to connect all objects randomly located within a house to the home server.

To resolve such disadvantages, a home network which performs a direct communication between objects (e.g. a network topology) can be considered. Meanwhile, an input of a user is required to establish one-to-one direct communication between objects. In this case, objects which do not provide a user interface for receiving the input of the user limits on establishing a direct communication.

SUMMARY

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

The terms "first", "second", etc. may be used to describe diverse components, but the components are not limited by the terms. The terms are only used to distinguish one component from the others.

Hereinafter, the present disclosure will be described in detail with reference to the accompanying drawings.

An aspect of the exemplary embodiments relates to an electronic apparatus which relays an establishment of communication to connect two devices and a controlling method thereof.

According to an exemplary embodiment, there is provided an electronic apparatus for establishing communication between a first device and a second device, the apparatus including a communicator configured to communicate with the first device; a user interface unit; and a controller configured to display identification information included in an advertising signal broadcasted from at least one device, and in response to a user command to select identification information of the second device from among at least one of the displayed identification information, control the communicator to transmit information for establishing communication between the first device and the second device to the first device.

In this case, in response to the user command to select the identification information of the second device, the controller may establish communication with the second device, transmit address information of the first device used in establishing communication with the first device to the second device, and transmit address information of the second device used in establishing communication with the second device to the first device.

The controller may transmit a scan request signal for instructing the first device to perform scanning for detecting an advertising signal broadcasted from at least one device to the first device, receive a result of the scanning from the first device which receives the scan request signal, display identification information of at least one device detected by the first device on the user interface based on the received scan result, and in response to a user command to select identification information of the second device among at least one of the displayed identification information, transmit a connection request signal for instructing an establishment of communication with the selected second device to the first device.

The controller may display identification information included in at least one advertising signal detected as a result of scanning, and in response to the user command to select identification information of the second device among at least one the displayed identification information, transmit a connection request signal for instructing an establishment of communication with the second device by using address information received from the second device to the first device.

The electronic apparatus may further include an NFC module configured to receive address information of the second device to establish communication with the second device located within a preset area, and the controller may transmit a connection request signal for instructing an establishment of communication with the second device by using the address information received from the second device to the first device.

The electronic apparatus may further include an NFC module configured to transmit address information of the first device to establish communication with the second device located within a preset area so that the second device establishes communication with the first device.

The first device may output streaming data received from the second device, the communicator may communicate with the second device, and in response to occurrence of a preset event, the controller may transmit a suspension request signal for requesting suspension of streaming to the second device, and in response to suspension of streaming occurred in the second device, the controller may stream data to the first device.

In this case, in response to occurrence of the event that streaming of the electronic apparatus is suspended, the controller may transmit a signal informing suspension of streaming to the first device, and transmit a streaming start command signal to the second device so as to resume streaming of the second device.

The first device may output streaming data received from the second device, the communicator may communicate with the second device, and in response to occurrence of a preset event, the controller may transmit a signal informing a start of streaming to the first device, and if the first device suspends streaming of the second device in response to the signal informing a start of streaming, the controller may stream data to the first device.

In this case, in response to occurrence of the event that streaming of the electronic apparatus is suspended, the controller may transmit a signal informing suspension of streaming to the first device so that the first device may output streaming of the second device.

According to an exemplary embodiment, there is provided a controlling method of an electronic apparatus for establishing communication between a first device and a second device, the method including establishing communication with the first device, displaying identification information included in an advertising signal broadcasted from at least one device, and in response to a user command to select identification information of the second device among at least one the displayed identification information, transmitting information for establishing communication between the first device and the second device to the first device.

In this case, the method further includes, in response to the user command to select the identification information of the second device, establishing communication with the second device, and the transmitting may transmit address information of the first device used in establishing communication with the first device to the second device, and transmit address information of the second device used in establishing communication with the second device to the first device.

Meanwhile, the method further includes transmitting a scan request signal for instructing the first device to perform scanning for detecting an advertising signal broadcasted from at least one device to the first device, receiving a scan result from the first device which receives the scan request signal, and the displaying may include displaying identification information regarding at least one device detected by the first device on the user interface based on the received scan result, and the in response to a user command to select identification information regarding the second device among at least one of the displayed identification information, the transmitting may transmit a connection request signal for instructing an establishment of communication with the second device to the first device.

Meanwhile, the displaying may include displaying identification information included in at least one advertising signal detected as a result of scanning, and in response to the user command to select the identification information of the second device among at least one of the displayed identification information, the transmitting may include transmitting a connection request signal for instructing an establishment of communication with the second device by using address information received from the second device to the first device.

Meanwhile, the method may further include receiving address information of the second device from the second device located within a preset area to establish communication, and the transmitting may include transmitting a connection request signal for instructing an establishment of communication with the second device by using the address information received from the second device to the first device.

The method may further include transmitting address information of the first device for establishing communication to the second device located within a preset area so that the second device establishes communication with the first device.

Meanwhile, the first device may output streaming data received from the second device, and the controlling method may further include establishing communication with the second device, transmitting a signal requesting suspension of streaming to the second device in response to occurrence of a preset event, and streaming data to the first device in response to suspension of streaming occurred in the second device.

In this case, the method may further include, in response to occurrence of an event that streaming of the electronic apparatus is suspended, transmitting a signal informing suspension of streaming to the first device, and transmitting a streaming start command signal to the second device so as to resume streaming of the second device.

Meanwhile, the first device may output streaming data received from the second device, and the controlling method may further include establishing communication with the second device, transmitting a signal informing a resume of streaming to the first device in response to occurrence of a preset event, and if the first device suspends streaming of the second device in response to the signal informing a resume of streaming, streaming data to the first device.

In this case, the method may further include, in response to occurrence of an event that streaming of the electronic apparatus is suspended, transmitting a signal informing suspension of streaming to the first device so that the first device may output streaming of the second device.

According to the above-described various exemplary embodiments, the user may establish communication between two devices where the user interface is not provided.

According to another exemplary embodiment, the user may use the electronic apparatus to convert a source device which transmits a multimedia content to an output device where a user interface is not provided.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIG. 16 is a flowchart provided to explain a controlling method of an electronic apparatus according to another exemplary embodiment.

DETAILED DESCRIPTION

Hereinafter, exemplary embodiments will be explained in detail with reference to the accompanying drawings. However, well-known functions or constructions are not described in detail since they would obscure the application with unnecessary detail.

Figure 1:
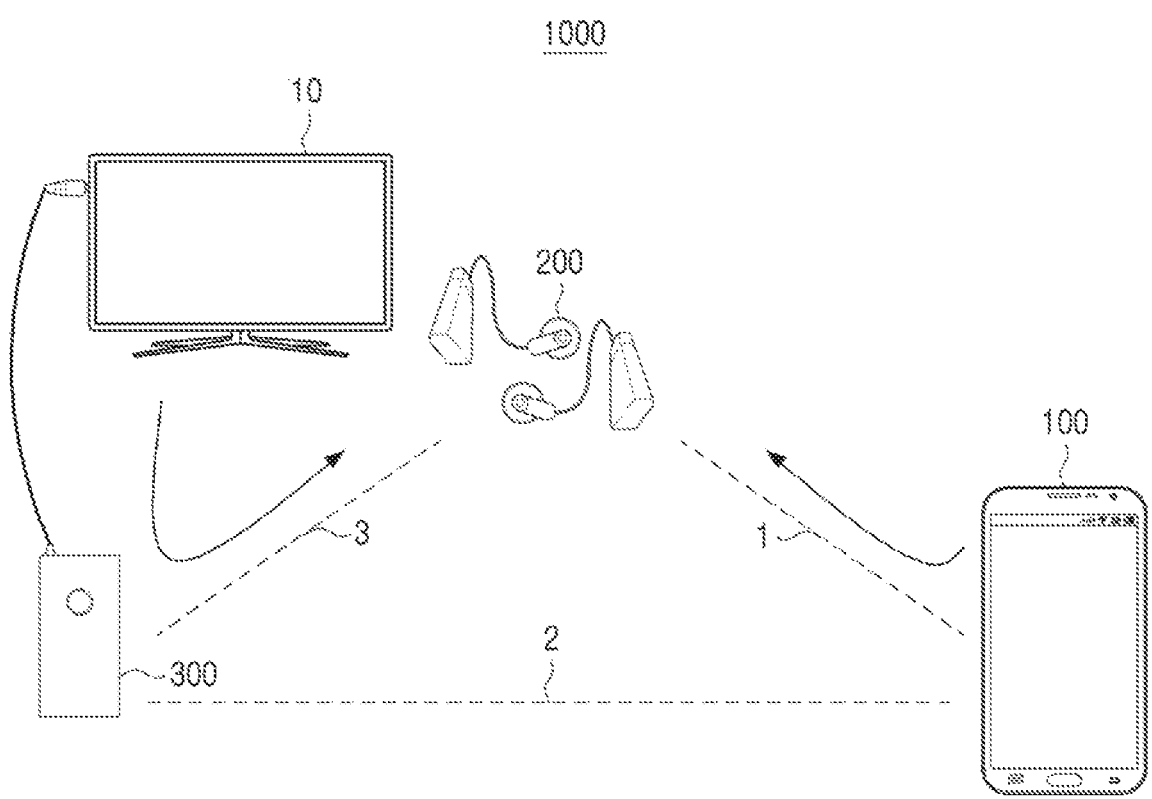
FIG. 1 is a view illustrating a communication system according to an exemplary embodiment.

FIG. 1 is a view illustrating a communication system according to an exemplary embodiment.

Referring to FIG. 1, a communication system 1000 includes a broadcast receiving device 10, an electronic apparatus 100, a first device 200, and a second device 300.

The broadcast receiving device 10 is a device for receiving at least one of a public/terrestrial broadcasting, a cable broadcasting, and a satellite broadcasting. The broadcast receiving device 10 may output a broadcasting content of a video and/or an audio from a received broadcasting signal. The broadcast receiving device 10 may be provided with a preliminary input/output terminal (AUX terminal) capable of outputting contents to an external device.

The electronic apparatus 100 connects the first device with the second device. Specifically, the electronic apparatus 100 may communicate with at least one of the first device and the second device. In addition, the electronic apparatus 100 may exchange a signal with at least one of first device and the second device, and establish communication between the first device and the second device. The electronic apparatus 100 includes a user interface for receiving an input of a user command to establish communication between the first device and the second device.

According to an exemplary embodiment of FIG. 1, the electronic apparatus 100 is a mobile phone which is portable for a user and is provided with a touch display panel.

The first device 200 establishes a first communication with the electronic apparatus 100. Specifically, the first device 200 may establish the first communication 1 with the electronic apparatus 100 to receive information for a connection with the second device 300.

In the exemplary embodiment of FIG. 1, the first device 200 is a hearing aid for amplifying a voice signal received through a wireless communication channel, and outputting the signal from a speaker mounted on a plug. Furthermore, the hearing aid supports a Bluetooth® communication.

The second device 300 supports communication with another device. Specifically, the second device 300 may communicate with another device by using a communication method according to the standard. The second device 300 may transmit information for establishing communication with another device. Specifically, the establishment of communication with the second device 300 requires a transmission and a reception of information for configuring the communication. The second device 300 may inform another device of its configuration and provide information enabling another device to establish communication with the second device.

The second device 300 may perform a unidirectional or a bidirectional communication with the electronic apparatus 100. Specifically, a second communication 2 may be a unidirectional communication directing to the electronic apparatus 100 (simplex) or a bidirectional communication capable of exchanging each other (duplex).

In the exemplary embodiment of FIG. 1, the second device 300 is a Bluetooth® dongle which is connected to the AUX terminal of the broadcast receiving device 10, and converts an audio output from the broadcast receiving device 10 to a wireless signal according to a protocol of the Bluetooth to transmit the wireless signal to another device.

The electronic apparatus 100 may transmit information for establishing a third communication 3 between the first device 200 and the second device 300 through a route among at least one of a first communication route and a second communication route. In the exemplary embodiment of FIG. 1, the mobile phone 100 transmits information for establishing a Bluetooth communication with the Bluetooth dongle 300 to the hearing aid 200. Accordingly, the hearing aid 200 where a user interface is not provided may establish a wireless communication with the Bluetooth dongle 300 according to the standard based on the information received from the mobile phone 100.

Figure 2:
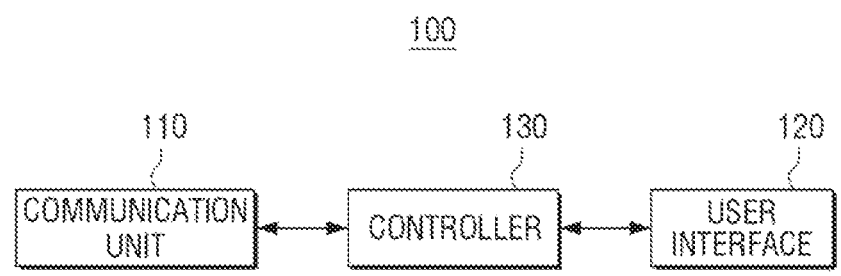
FIG. 2 is a block diagram illustrating configuration of an electronic apparatus according to an exemplary embodiment.

FIG. 2 is a block diagram illustrating a configuration of an electronic apparatus according to an exemplary embodiment.

Referring to FIG. 2, the electronic device 100 includes a communicator 110, a user interface 120, and a controller 130.

The communicator 110 performs communication with a first device. Specifically, the communicator 110 completes a procedure of establishing communication with the first device, and communicates with the first device. In an exemplary embodiment, the communicator 110 performs communication with the first device according to a Bluetooth 4.0™ standard. In this case, the electronic apparatus 100 may play a role of a central device.

A Bluetooth Low energy (BLE) announced in the adoption of Bluetooth 4.0 uses a low-power-consuming wireless communication method which is significantly different from the conventional Bluetooth. Two devices connected to each other according to the BLE are divided into a peripheral device and a central device according to a role. The peripheral device is designed to be operated in connection with the central device. The peripheral device advertises itself according to a Generic Access Profile (GAP). More specifically, the peripheral device broadcasts an advertising packet on a certain cycle (e.g. advertising interval). The central device performs scanning of surroundings, finding an advertising peripheral device, and establishing a connection to the peripheral device. The central device, in response to the peripheral device being detected, may transmit a signal for requesting Scan Response data to identify the detected peripheral device. The Scan Response data contains additional information such as a name of the peripheral device.

The communicator 110 may include at least one chip for supporting a one-to-one wireless communication such as Bluetooth, WFi-Direct, Zigbee. In particular, the communicator 100 may include a BLE module in an exemplary embodiment. Besides, the communicator 110 may perform communication according to various communication standards such as WiFi, Wibro, 3GPP, LTE.

The user interface 120 provides an interface for establishing communication between the first device and a second device.

The user interface 120 may be provided with a plurality of keys enabling a user to establish and select each type of function provided by the electronic apparatus 100 and a display capable of displaying each type of information provided by the electronic device 100.

The user interface 120 may be implemented by using a monitor and an input device connected to the main body, and may be implemented by a device capable of inputting and outputting simultaneously like a touch screen. In this case, the user interface 120 may be configured by layer-stacking a touch sensor and a display panel. The touch sensor may be implemented by a touch sensor capable of sensing a touch of the user and a proximity sensor for sensing proximity of the user's touch. The display panel may be implemented by a liquid crystal display (LCD), a light emitting diode (LED), a plasma display panel (PDP), and etc.

A controller 130 controls each configuration of the electronic apparatus 100. Specifically, the controller 130 may control each feature of the electronic device 100 for performing a function of connecting the first device and the second device communicatively.

The controller 130 displays identification information included in an advertising signal broadcasted from at least one device on the user interface 120. Herein, the identification information may include a UUID included in an advertising packet and a name of a device included in additional information. The user may select a second device to be connected among at least one of the identification information displayed by using the user interface 120.

The controller 130 controls the communicator 110 to transmit information for establishing communication between the first device and the second device to the first device in response to a user command to select identification information of the second device among at least one of the displayed identification information. Specifically, the controller 130 may transmit information which is necessary for configuring communication to the first device so as to enable the first device to establish a connection with the second device the user selected. The detailed description regarding an operation of transmitting information necessary for connection will be provided later with reference to FIGS. 5 to 7.

The controller 130 includes a Central Processing Unit (CPU), a Read-Only Memory (ROM) in which a control program for controlling the electronic apparatus 100 is stored, and a Random Access Memory (RAM) used for memorizing a signal or data input from outside of the electronic device, or used as a memory region for an operation performed by the electronic apparatus 100. The CPU may include at least one of a single core processor, a dual core processor, a triple core processor, and a quad core processor. The CPU, the ROM, and the RAM may be connected to each other through an internal bus.

The electronic apparatus 100 as the above relays a connection between two devices which do not provide a user interface so that the electronic apparatus 100 may establish a direct communication between two devices.

Figure 3:
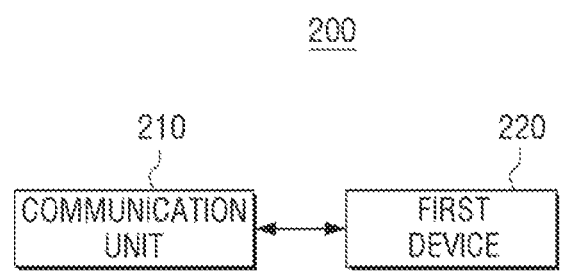
FIG. 3 is a block diagram illustrating configuration of a first device according to an exemplary embodiment.

FIG. 3 is a block diagram illustrating a configuration of a first device according to an exemplary embodiment.

Referring to FIG. 3, a first device 200 does not include a configuration which provides a user interface capable of establishing communication between the first device 200 and another device.

A communicator 210 performs communication between the electronic apparatus 100 and another device 300.

The communicator 210 may receive information necessary for connecting the electronic apparatus to a second device through a channel established with the electronic apparatus 100.

A controller 220 controls each configuration of the first device 200. Specifically, the controller 220 may control the communicator 210 to establish communication with a second device 300 based on information received from the electronic apparatus 100.

The controller 220 may control the first device 220 to perform a unique function of the first device 220. In an exemplary embodiment, the controller 220 may control sound information received from an external device to be output from a speaker (not shown) at a high level of volume so as to implement a function of a hearing aid.

Herein, the second device 300 is not illustrated, but there is no difference from the first device 200 in terms of configuration. However, an operation for performing an individual function of the second device 300 may be different from that of the first device 200. In an exemplary embodiment, the second device 300 may perform a process of converting audio data received through a cable into a wireless signal in order to implement a function of Bluetooth dongle.

Figure 4:
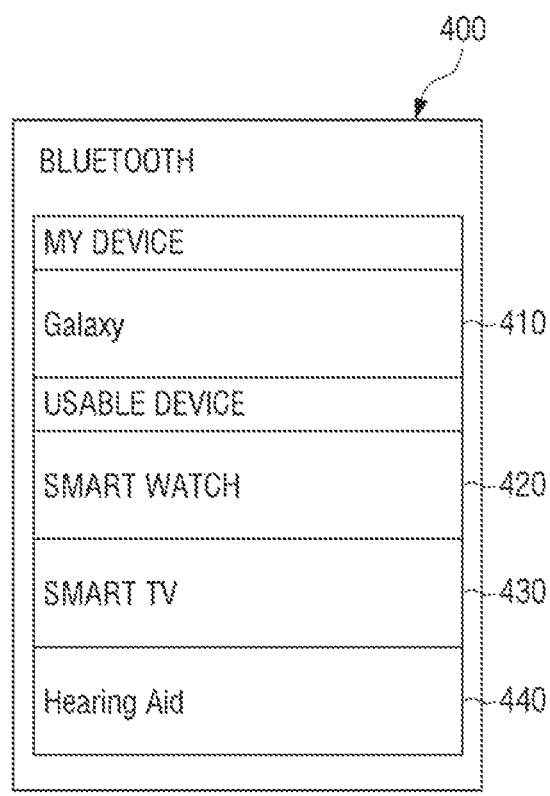
FIG. 4 is a view illustrating a screen displayed on a user interface of an electronic device.

FIG. 4 is a view illustrating a screen displayed on a user interface of an electronic apparatus according to an exemplary embodiment.

Referring to FIG. 4, a screen 400 includes information related to a function of Bluetooth dongle. A name 410 of the electronic apparatus 100 is displayed on my list of devices. A user may select a region where the name 410 is displayed, and may activate or deactivate an operation of broadcasting an advertising signal to another device.

On a list of usable devices, identification information 420, 430, and 440 regarding other devices sensed by scanning performed by the electronic apparatus 100 are arranged. Specifically, the screen 400 in FIG. 4 includes a clock, a TV, and names of hearing aids 420, 430, and 440. The user may select the name 440 of the second device 300, and enable the first device 200 to be connected to the second device 300.

Figure 5:
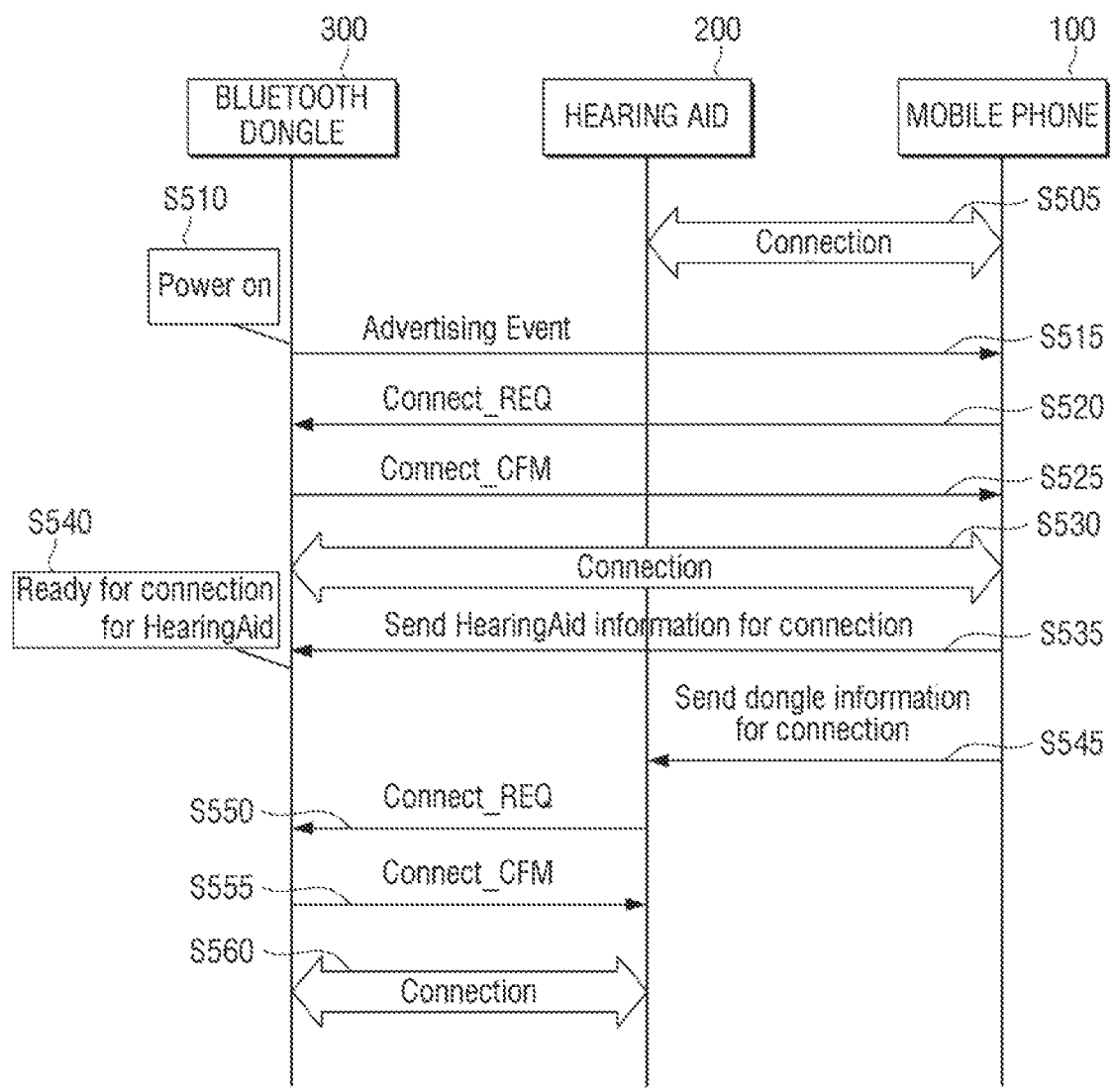
FIG. 5 is a sequence diagram provided to explain a communication connection method according to a first exemplary embodiment with reference to a configuration of FIG. 1.

FIG. 5 is a sequence diagram provided to explain a communication connection method according to the first exemplary embodiment with reference to the configuration of FIG. 1.

Referring to FIG. 5, a first communication between the mobile phone 100 and the hearing aid 200 is established. For example, the first communication may be a Bluetooth according to the BLE standard.

In response to the Bluetooth dongle 300 being powered-on (S510), the dongle 300 broadcasts an advertising signal including information capable of identifying oneself (S515).

While performing scanning, the mobile phone 100 also senses an advertising signal of the Bluetooth dongle 300. The mobile phone 100 transmits a signal for establishing communication to the Bluetooth dongle 300 (S515).

The Bluetooth dongle 300 transmits a response signal confirming a connection to the mobile phone 100 in response to a request signal received from the mobile phone 100. As a result, a second communication is established between the mobile phone 100 and the Bluetooth dongle 300. The second communication is a device-to-device communication like the first communication, and conforms a Bluetooth protocol according to the BLE standard.

The mobile phone 100 transmits information necessary for a connection with the hearing aid 200 to the Bluetooth dongle 300 through a connected data channel of the second communication (S535). In an exemplary embodiment, the mobile phone 100 may transmit address information of the hearing aid 200 to the Bluetooth dongle 300. The mobile phone 100 obtains the address information of the hearing aid 200 when establishing the first communication with the hearing aid 200. The mobile phone 100 may transmit the address information of the hearing aid 200 used in establishing communication with the hearing aid 200 to the Bluetooth dongle 300. The Bluetooth dongle 300 which receives the information necessary for connection prepares a connection with the hearing aid 200 (S540).

The mobile phone 100 transmits information necessary for a connection with the Bluetooth dongle 300 to the hearing aid 200 through a connected data channel of the first communication (S545). Likewise, the mobile phone 100 may transmit the address information of the Bluetooth dongle 300 used in establishing the second communication with the Bluetooth dongle 300 to a hearing aid 300. In addition, information necessary for connection may include a connection request for instructing the hearing aid 200 to establish communication with the Bluetooth dongle 300.

The hearing aid 200 transmits a connection request signal for establishing a third communication to the Bluetooth dongle 300 identified based on received information (S550). The Bluetooth dongle 300 transmits a signal informing an establishment of connection to the hearing aid 200 in response to the connection request signal (S555). According to the above procedure, the third communication is established between the hearing aid 200 and the Bluetooth dongle 300 (S560).

Figure 6:
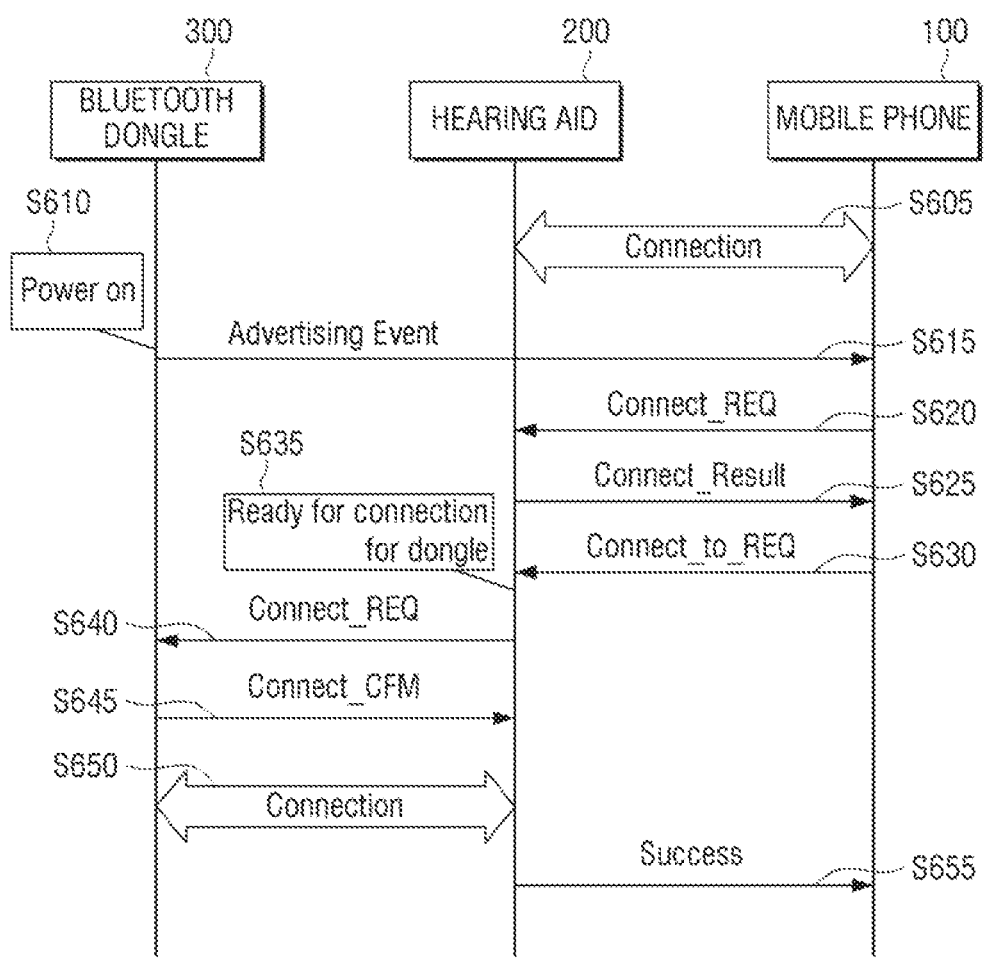
FIG. 6 is a sequence diagram provided to explain a communication connection method according to a second exemplary embodiment with reference to a configuration of FIG. 1.

FIG. 6 is a sequence diagram provided to explain communication connection according to a second exemplary embodiment with reference to the configuration of FIG. 1.

Referring to FIG. 6, a first communication is established between the mobile phone 100 and the hearing aid 200 (S605). Herein, the first communication is not limited to a D2D communication unlike that of the first exemplary embodiment.

In response to the Bluetooth dongle 300 being powered-on (S610), the Bluetooth dongle 300 broadcasts an advertising signal (S615). The broadcasted advertising signal is sensed by the mobile phone 100 while performing scanning.

The mobile phone 100 which senses the advertising signal transmitted from a device transmits a scan request signal for instructing scanning to the hearing aid 200 (S620). Accordingly, in the second exemplary embodiment, the hearing aid 200 may perform not only a role of a peripheral device, but also a role of a central device. The hearing aid 200 performs scanning according to the instruction, and transmits a result of sensing the advertising signal to the mobile phone 100 (S625).

The mobile phone 100 which receives the scan result displays at least one of sensed identification information of a BLE device. Furthermore, the mobile phone 100 receives an input of a user command to select identification information regarding the Bluetooth dongle 300 among at least one of the displayed identification information. In response to the user command, the mobile phone 100 transmits a connection request signal for instructing an establishment of communication with the selected Bluetooth dongle 300 to the hearing aid 200. As a result, the hearing aid 200 has information necessary for a connection with the Bluetooth dongle 300, and may determine the Bluetooth dongle 300 as an object to be connected based on the received connection request signal (S635).

The hearing aid 200 which is prepared for a connection with the Bluetooth dongle 300 transmits a connection request signal to the Bluetooth dongle 300 (S640), and in response to this request, receives a connection confirm signal (S645). According to the above procedure, the third communication between the hearing aid 200 and the Bluetooth dongle 300 is established (S650). In addition, the hearing aid 200 may notify the mobile phone 100 that a D2D communication connection with the Bluetooth dongle 300 is established (S655).

Figure 7:
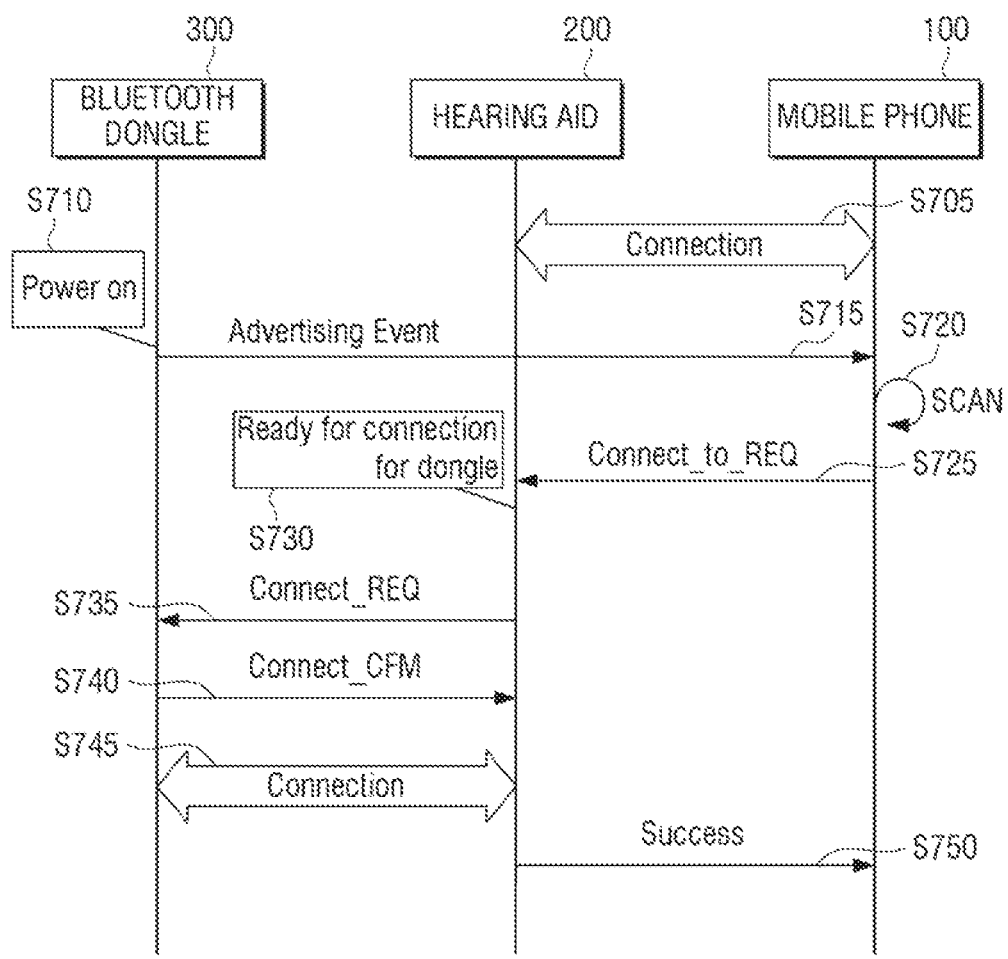
FIG. 7 is a sequence diagram provided to explain a communication connection method according to a third exemplary embodiment with reference to a configuration of FIG. 1.

FIG. 7 is a sequence diagram provided to explain a communication connection method according to the third exemplary embodiment with reference to the configuration of FIG. 1.

Referring to FIG. 7, a first communication between the mobile phone 100 and the hearing aid 200 is established (S705). Herein, the first communication is not limited to a D2D communication unlike that of the first exemplary embodiment.

In response to the Bluetooth dongle 300 being powered-on (S710), the dongle 300 broadcasts an advertising signal (S715). The broadcasted advertising signal is sensed by the mobile phone 100 while performing scanning.

The mobile phone 100 may perform scanning periodically until the advertising signal broadcasted from the Bluetooth dongle 300 is sensed (S720). Identification information included in at least one of the advertising signals sensed as a result of the scanning may be displayed on the mobile phone 100. The user selects identification information which indicates the Bluetooth dongle 300 among the displayed identification information.

In response to a user command to select the Bluetooth dongle 300, the mobile phone 100 transmits a connection request signal for instructing an establishment of communication with the Bluetooth dongle 300 by using Bluetooth address received from the Bluetooth dongle 300 to the hearing aid 200 (S725). The hearing aid 200 receives information necessary for communication connection with the Bluetooth dongle 300 from the mobile phone 100.

The mobile phone 200 prepares for a connection with the dongle 300 in response to the information and the request received from the mobile phone 100 (S730). The hearing aid 200 transmits a signal for requesting a connection with the Bluetooth® dongle 300 by using BT address of the Bluetooth dongle 300 received from the mobile phone (S735). In response to this signal, the Bluetooth dongle 300 which receives the connection request signal transmits a connection confirm signal to the hearing aid 200 (S740). According to the above procedure, a third communication is established between the hearing aid 200 and the Bluetooth dongle 300 (S745). In addition, the hearing aid 200 may notify the mobile phone 100 that a D2D communication with the Bluetooth dongle 300 is established (S750).

Figure 8:
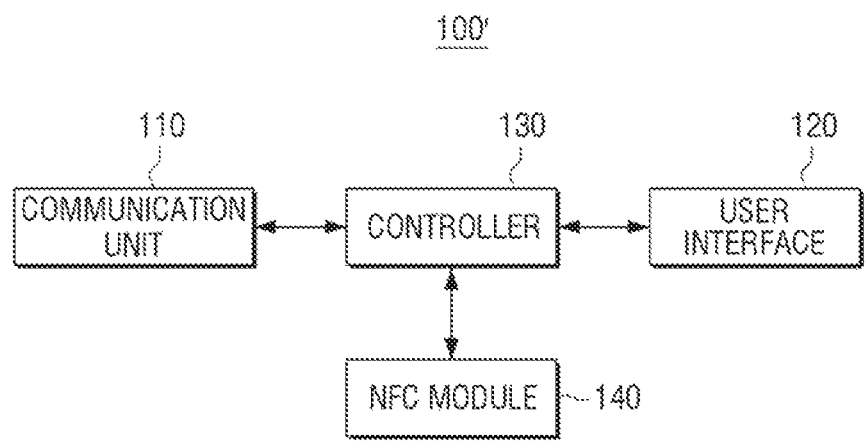
FIG. 8 is a block diagram illustrating a configuration of an electronic apparatus according to another exemplary embodiment.

FIG. 8 is a block diagram illustrating a configuration of an electronic apparatus according to another exemplary embodiment.

Referring to FIG. 8, the electronic apparatus 100 includes the communicator 110, the user interface 120, the controller 130, and an NFC module 140. Herein, a configuration and an operation of the communicator 110, the user interface 120, and the controller 130 will not be described in detail since they are the same as that of the communicator 110, the user interface 120, and the controller 130 illustrated in FIG. 2.

The NFC module 140 performs a wireless communication for a short range. Specifically, the NFC module performs a short-range wireless communication using a Near Field Communication method. The NFC means a contactless short-range wireless communication method using a frequency range of 13.56 Mz. With a user of the NFC technique, data may be transmitted and received when a plurality of terminals approach to within a short distance, such as about 10 centimeters or less. According to an exemplary embodiment, the NFC module 140 may include at least one of a RF antenna for reading and writing NFC tags of a second device, an NFC chip, and an NFC usim for recording data transmitted and received through NFC communication. In this case, the NFC module 140 may conform the standard of ISO/IEC 18092 which supports a bidirectional communication with the NFC module of the second device.

Herein, an electronic apparatus 100' may be implemented by portable devices. For example, the electronic apparatus 100' may be a mobile phone, a PDA, a laptop, a digital camera, a game machine, an e-book, and etc. Furthermore, a user may hold the electronic apparatus 100', and tag the electronic apparatus 100' to the second device. Herein, a tagging means a motion of approaching to a distance capable of NFC communication between two devices supporting an NFC communication.

The NFC module 140 receives address information of the second device. Specifically, if the second device is located within a preset range by a motion of tagging, the NFC module 140 may receive address information for establishing communication with the second device. In this exemplary embodiment, the second device is provided with an encounter NFC module of the NFC module 140. In another exemplary embodiment, the NFC module 140 may be replaced with a RFID reader, and the second device may be replaced with a RFID tag in which the address information of the second device is recorded.

In another exemplary embodiment, the NFC module 140 transmits address information of a first device to the second device. Specifically, if the NFC module 140 tags with the second device, the second device may transmit the address information of the first device for establishing communication with the first device.

The controller 130 controls the communicator 110 to transmit a connection request signal for instructing an establishment of communication with the second device by using the address information of the second device received by the NFC module 140. Specifically, the controller 130 may transmit the request for instructing an establishment of communication with the second device to the first device. Accordingly, the first device may perform a procedure of establishing communication between the second device and a third device by using the received address information of the second device.

Figure 9:
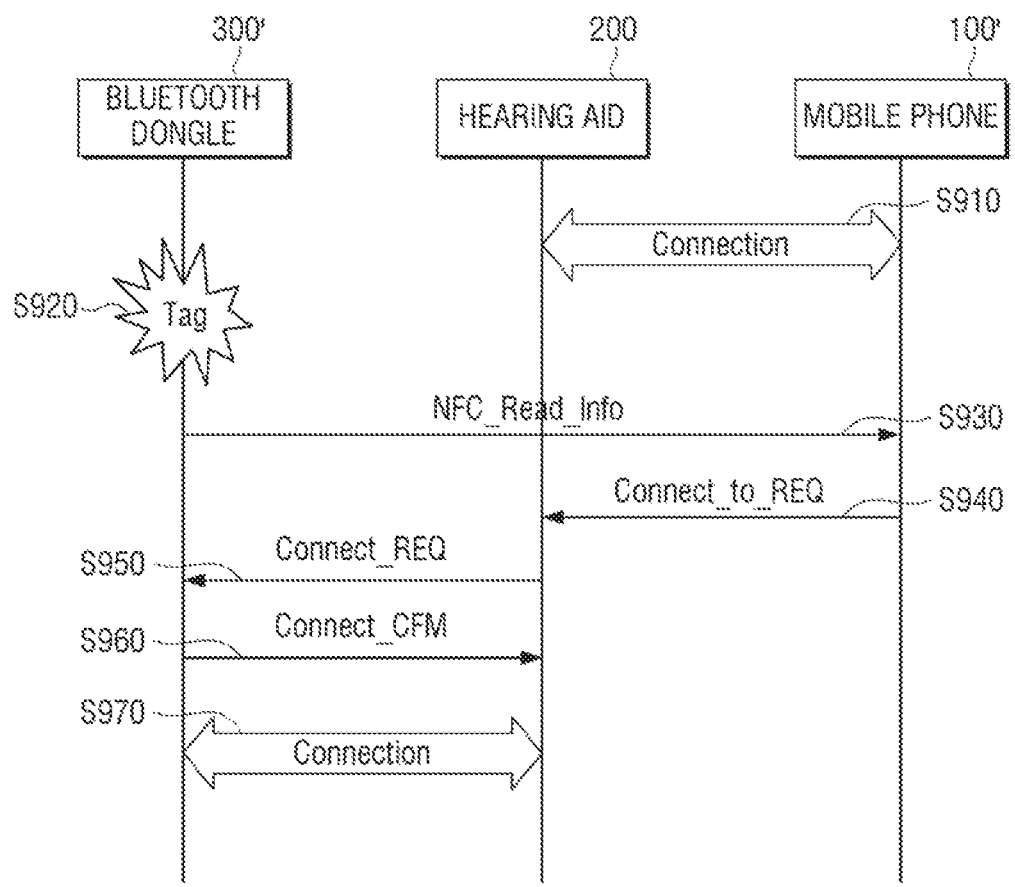
FIG. 9 is a sequence diagram provided to explain a communication connection method according to a fourth exemplary embodiment with reference to a configuration of FIG. 1.

FIG. 9 is a sequence diagram provided to explain a communication connection method according to a fourth exemplary embodiment with reference to FIG. 1.

Referring to FIG. 9, a communication system 1000' includes a mobile phone 100' provided with an NFC module and a Bluetooth dongle 300' provided with the hearing aid 200 and the NFC module.

The mobile phone 100' and the hearing aid 200 are connected to each other through a first communication (S910). The mobile phone 100' tags the Bluetooth dongle 300' (S920).

The mobile phone 100' reads information recorded in an NFC module of the Bluetooth dongle 300. That is, the mobile phone 100' reads address information of the Bluetooth dongle 300' recorded in the NFC module of the Bluetooth dongle 300' (S930).

The mobile phone 100' transmits a connection request signal for requesting a connection with the Bluetooth dongle 300' to the hearing aid 200 by using the received address information. The hearing aid 200 which receives information necessary for a connection with the Bluetooth dongle 300' starts a procedure of establishing communication with the Bluetooth dongle 300'. Specifically, the hearing aid 200 transmits a signal for requesting a connection to the Bluetooth dongle 300' by using the address information of the Bluetooth dongle 300' received by the mobile phone 100 (S950). In response to this signal, the Bluetooth dongle 300' which receives the connection request signal transmits a connection confirm signal to the hearing aid 200 (S960). According to the above procedure, a third communication between the hearing aid 200 and the Bluetooth dongle 300' is established (S970).

Figure 10:
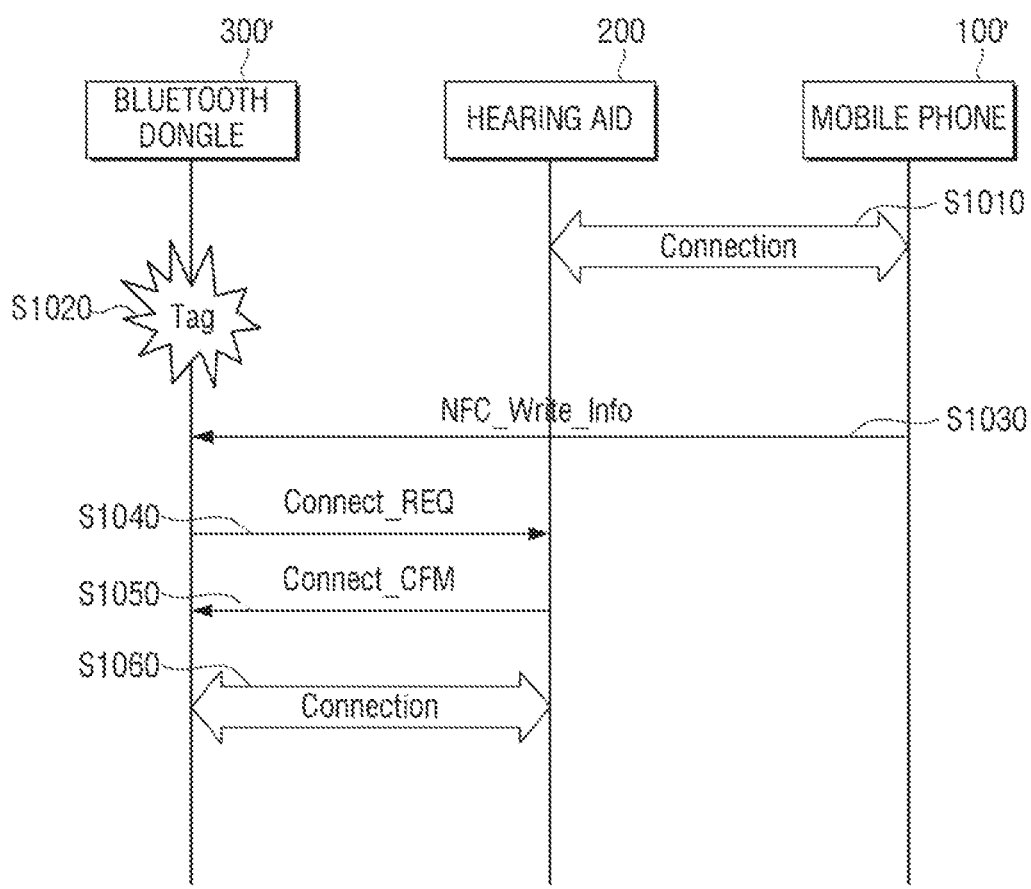
FIG. 10 is a sequence diagram provided to explain a communication connection method according to a fifth exemplary embodiment with reference to a configuration of FIG. 1.

FIG. 10 is a sequence diagram provided to explain a communication connection method according to a fifth exemplary embodiment with reference to the configuration of FIG. 1.

A communication system 1000' includes a mobile phone 100' provided with an NFC module, the hearing aid 200, and the Bluetooth dongle 300' provided with the NFC module.

The mobile phone 100' and the hearing aid 200 are connected to each other through a first communication (S1010). The mobile phone 100' tags the Bluetooth dongle 300' (S1020).

The mobile phone 100' transmits address information of the hearing aid 200 to the Bluetooth dongle 300' (S1030). Specifically, in response to the mobile phone 100' being tagged, the address information of the hearing aid 200 may be recorded in the NFC module of the Bluetooth dongle 300'.

The Bluetooth dongle 300' starts a procedure of establishing communication with the hearing aid 200.

Specifically, the Bluetooth dongle 300' transmits a signal for requesting a connection to the Bluetooth dongle 300' by using the address information of the hearing aid 200 received from the mobile phone 100 (S1040). In response to this signal, the hearing aid which receives the connection request signal transmits a connection confirm signal to the Bluetooth dongle 300' (S1050). According to the above procedure, a third communication between the hearing aid 200 and the Bluetooth dongle 300' is established (S1060).

Figure 11:
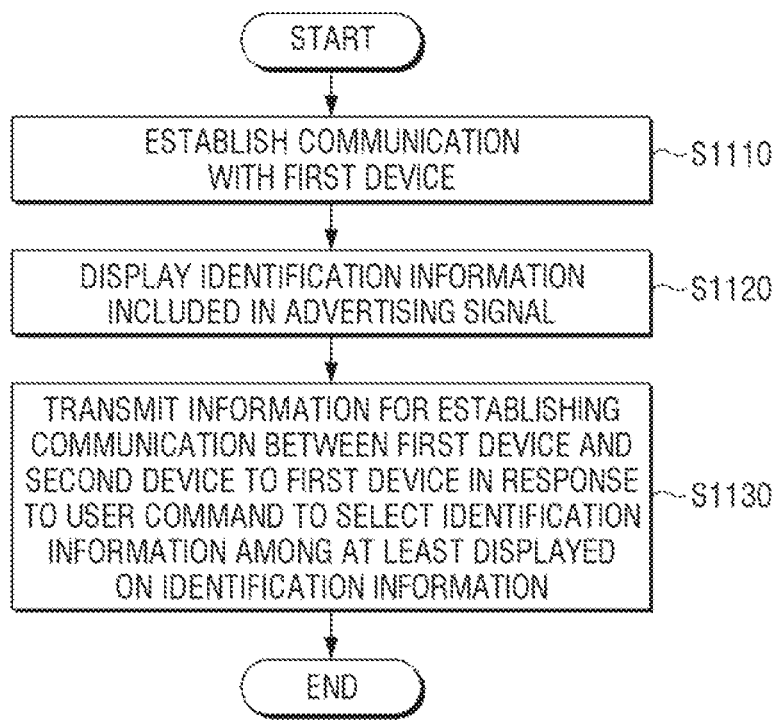
FIG. 11 is a flowchart provided to explain a controlling method of an electronic apparatus according to an exemplary embodiment.

FIG. 11 is a flowchart provided to explain a control method of an electronic apparatus according to an exemplary embodiment.

Referring to FIG. 11, communication is firstly established with a first device (S1110). Specifically, the electronic apparatus has an ability to connect communication by itself. Therefore, the electronic apparatus may establish communication with the first device.

Then, identification information included in an advertising signal is displayed (S1120). Specifically the electronic apparatus may perform scanning. Furthermore, the electronic apparatus may sense the advertising signal broadcasted from at least one of devices. The electronic apparatus may display identification information included in at least one of the sensed advertising signal.

Then, among at least one of the displayed identification information, a second device transmits information for establishing communication between the first device and the second device to the first device in response to a user command to select identification information regarding the second device (S1130). Specifically, the electronic apparatus may receive the user command to select the identification information regarding the second device among at least one of the displayed identification information. The electronic apparatus may transmit information included in the sensed advertising signal corresponding to the selected second device to the first device.

According to another exemplary embodiment, the controlling method further includes establishing communication with the second device. Furthermore, the step of S1130 may be configured by steps of transmitting address information of a first device used in establishing communication with the first device to a second device, and transmitting address information used in establishing communication with the second device to the first device.

According to another exemplary embodiment, the method further includes transmitting a scan request signal for instructing scanning to the first device and receiving a result of scanning from the first device which receives the scan request signal. Furthermore, the step of S1120 is configured by displaying identification information based on the received scan result, and the step of S1130 may include transmitting a connection request signal for instructing an establishment of communication with the second device to the first device in response to a user command to select identification information regarding the second device among the displayed identification information.

According to another exemplary embodiment, the step of S1120 further includes

According to another exemplary embodiment, the method further includes receiving address information of the second device for establishing communication from the second device located within a preset range. Furthermore, the step of S1130 may include transmitting a connection request signal for instructing an establishment of communication with the second device to the first device by using the address information received from the second device.

According to another exemplary embodiment, the method may further include transmitting the address information of the first device for establishing communication to the second device location in the preset range to enable the second device to establish communication with the first device.

According to the above methods, the user may establish a direct communication between two devices in which a user interface is not provided by using the electronic device.

Hereinafter, with reference to FIGS. 12 to 14, a method of converting a streaming device will be described. In the exemplary embodiments, a source device for streaming data is the mobile phone 100 and the Bluetooth dongle 300. Furthermore, the hearing aid 200 is an output device for outputting audio data of a received signal as a sound. The mobile phone 100 and the Bluetooth dongle 300 may transmit a signal containing audio information to the hearing aid 200. In the exemplary embodiments, an audio is described for an example of streamed data, but it is not limited thereto. The streamed data may be data of a multimedia content including at least one of a text, an audio, and a video.

Figure 12:
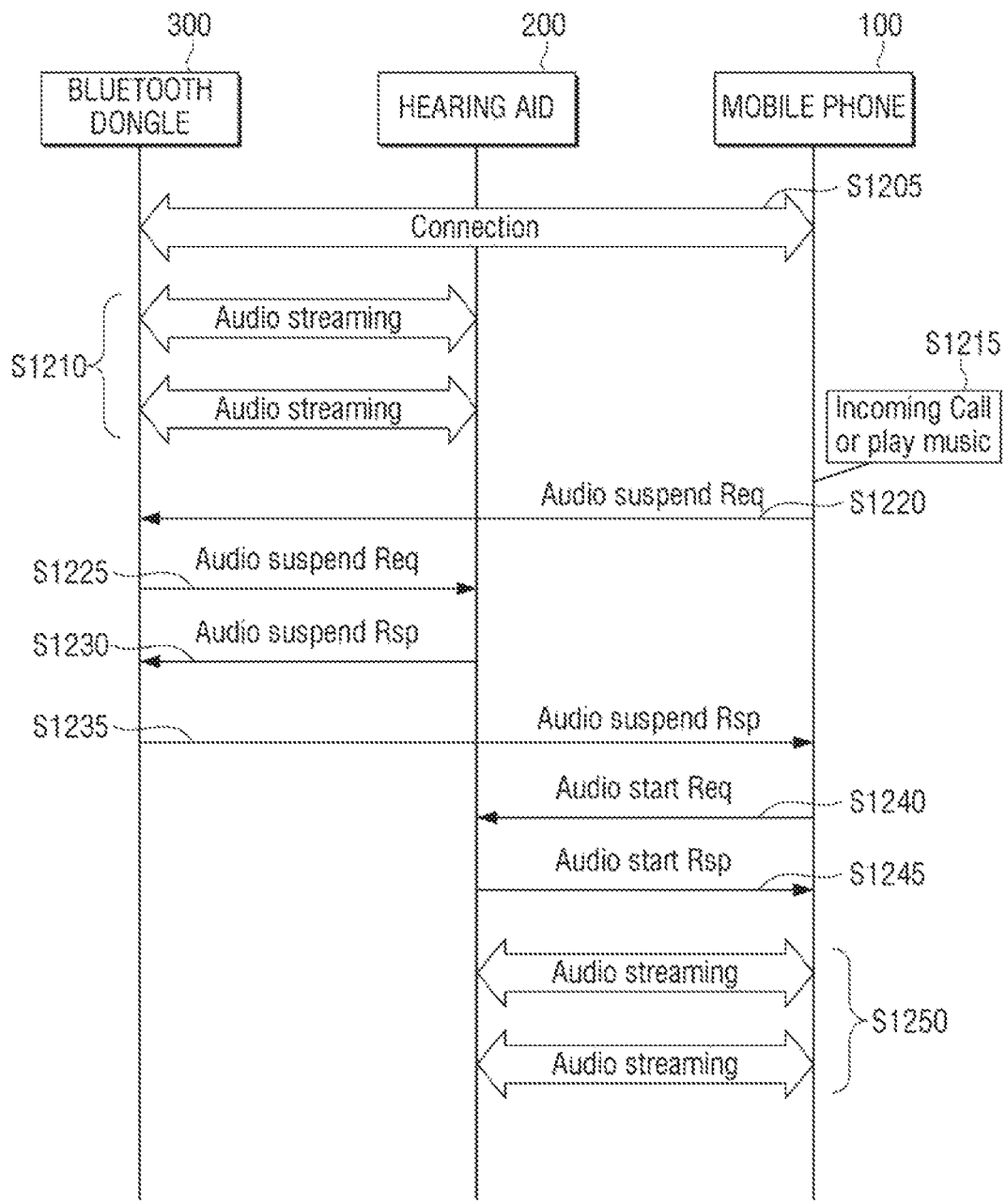
FIG. 12 is a sequence diagram provided to explain a method of converting a source device according to the first exemplary embodiment.

FIG. 12 is a sequence diagram provided to explain a conversion method of a source device according to the first exemplary embodiment with reference to FIG. 1.

Referring to FIG. 12, communication is established between the mobile phone 100, the hearing aid 200, and the Bluetooth dongle 300. Specifically, a first communication between the mobile phone 100 and the hearing aid 200, a second communication between the mobile phone 100 and the Bluetooth dongle 300, and a third communication between the hearing aid 200 and the Bluetooth dongle 300 are established.

The Bluetooth dongle 300 streams audio data to the hearing aid 200. Referring to an example of FIG. 1, the Bluetooth dongle 300 converts audio data of a broadcasting signal received from a broadcast receiving apparatus 10 in real time into a wireless signal, and may transmit the signal to the hearing aid 200.

The mobile phone 100 senses occurrence of a preset event. Specifically, the mobile phone 100 may sense reception of a call signal and a user input for commanding the mobile phone 100 to play a music.

The mobile phone 100 transmits a signal for requesting suspension of streaming to the Bluetooth dongle 300 (S1220). Specifically, the mobile phone 100 may transmit a signal requesting suspension of streaming to the Bluetooth dongle 300 while the Bluetooth dongle 300 performs streaming to the hearing aid 200.

The Bluetooth dongle 300 transmits a signal informing suspension of streaming to the hearing aid 200 (S1225). The hearing aid 200 transmits a response signal for confirming that the transmitted signal is received to the Bluetooth dongle 300 (S1230).

The Bluetooth dongle 300 transmits a response signal informing suspension of streaming to the mobile phone 100. The mobile phone 100 which receives the response from the Bluetooth dongle 300 transmits a signal informing a start of streaming audio to the hearing aid 200 (S1240). In response to receiving a response signal for allowing streaming from the hearing aid 200 (S1245), the mobile phone 100 streams audio data to the hearing aid 200 (S1250).

Figure 13:
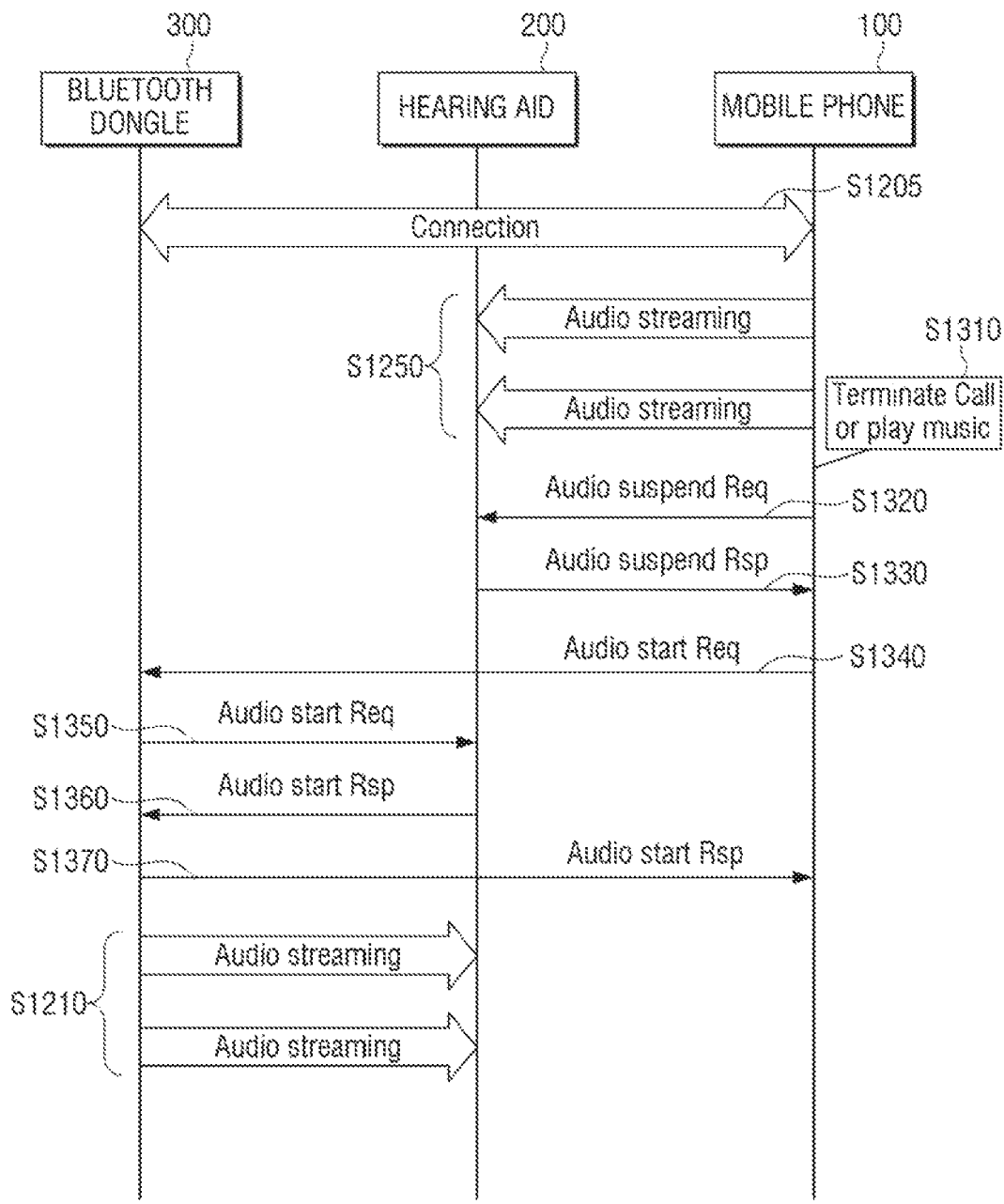
FIG. 13 is a sequence diagram provided to explain a method of returning to a previous source device after conversion according to an exemplary embodiment of FIG. 12.

FIG. 13 is a sequence diagram provided to explain a method of returning to a previous source device after the conversion according to the exemplary embodiment of FIG. 12.

Referring to FIG. 13, the mobile phone 100, the hearing aid 200, and the Bluetooth dongle 300 are connected to each other through a first communication, a second communication, and a third communication as shown in FIG. 12 (S1205). Furthermore, the mobile phone 100 is streaming voice data from a reception side or audio data of music being played to the hearing aid 200 (S1250).

The mobile phone 100 senses occurrence of an event that the streaming is suspended. For example, the mobile phone 100 may sense a call suspension signal or an input of the user for suspending a play of music (S1310). In response to the occurrence of event that the streaming is suspended, the mobile phone 100 transmits an audio suspension signal informing suspension of the streaming (S1320).

In response to receiving a response of confirming suspension of streaming in the mobile phone 100 from the hearing aid 200, the mobile phone 100 transmits a signal for requesting a resume of streaming to the Bluetooth dongle 300 (S1340).

In response to receiving a signal informing that it is available to perform steaming from the mobile phone 100, the Bluetooth dongle 300 transmits a signal for requesting streaming to the hearing aid 200 (S1350). In response to receiving a response signal for allowing streaming from the hearing aid 200, the Bluetooth dongle 300 transmits a response signal informing a resume of streaming to the mobile phone 100 (S1370), and resumes the suspended streaming to the hearing aid 200 (S1210).

According to the first exemplary embodiment as the above, a source device performing communication may be converted into another source device even if a user interface is not provided by a procedure of transmitting and receiving a signal between a plurality of source devices and one output device.

Figure 14:
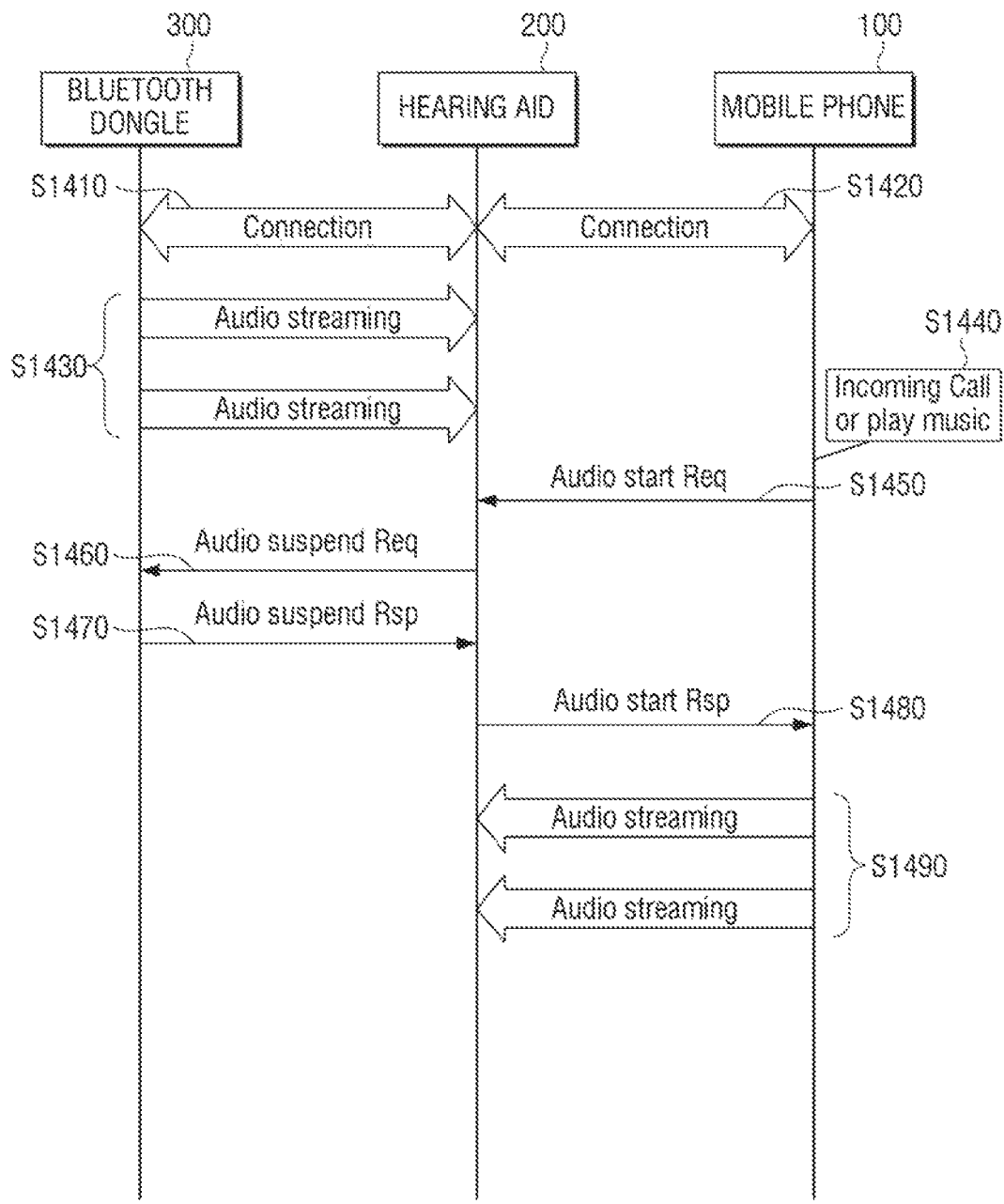
FIG. 14 is a sequence diagram provided to explain a method of returning to a previous source device according to the second exemplary embodiment with reference to a configuration of FIG. 1.

FIG. 14 is a sequence diagram provided to explain a conversion method of a source device according to the second exemplary embodiment with reference to the configuration of FIG. 1.

Referring to FIG. 14, the mobile phone 100 is connected to the hearing aid 200 through a first communication (S1420). Furthermore, the hearing aid 200 is connected to the Bluetooth dongle 300 through a third communication (S1410). The Bluetooth dongle 300 streams audio data to the hearing aid 200 through a data channel of the established third communication (S1430).

The mobile phone 100 senses an occurrence of preset event. Specifically, the mobile phone 100 may sense an input of a user commanding a reception of a call signal or a play of music (S1440). In response to occurrence of a preset event, the mobile phone 100 transmits a signal for requesting the hearing aid 200 to resume streaming (S1450).

In response to receiving a signal for requesting a resume of streaming from the mobile phone 100, which is another source device, the hearing aid 200 transmits a signal for requesting suspension of streaming to the Bluetooth dongle 300. In response to receiving a response signal for informing that suspension of streaming is confirmed (S1470), the hearing aid 200 transmits a start response signal for informing that it is available to stream data to the mobile phone 100 (S1480). The mobile phone 100 which receives the response signal performs streaming of a call ring tone or a music being played to the hearing aid 200 (S1490).

Figure 15:
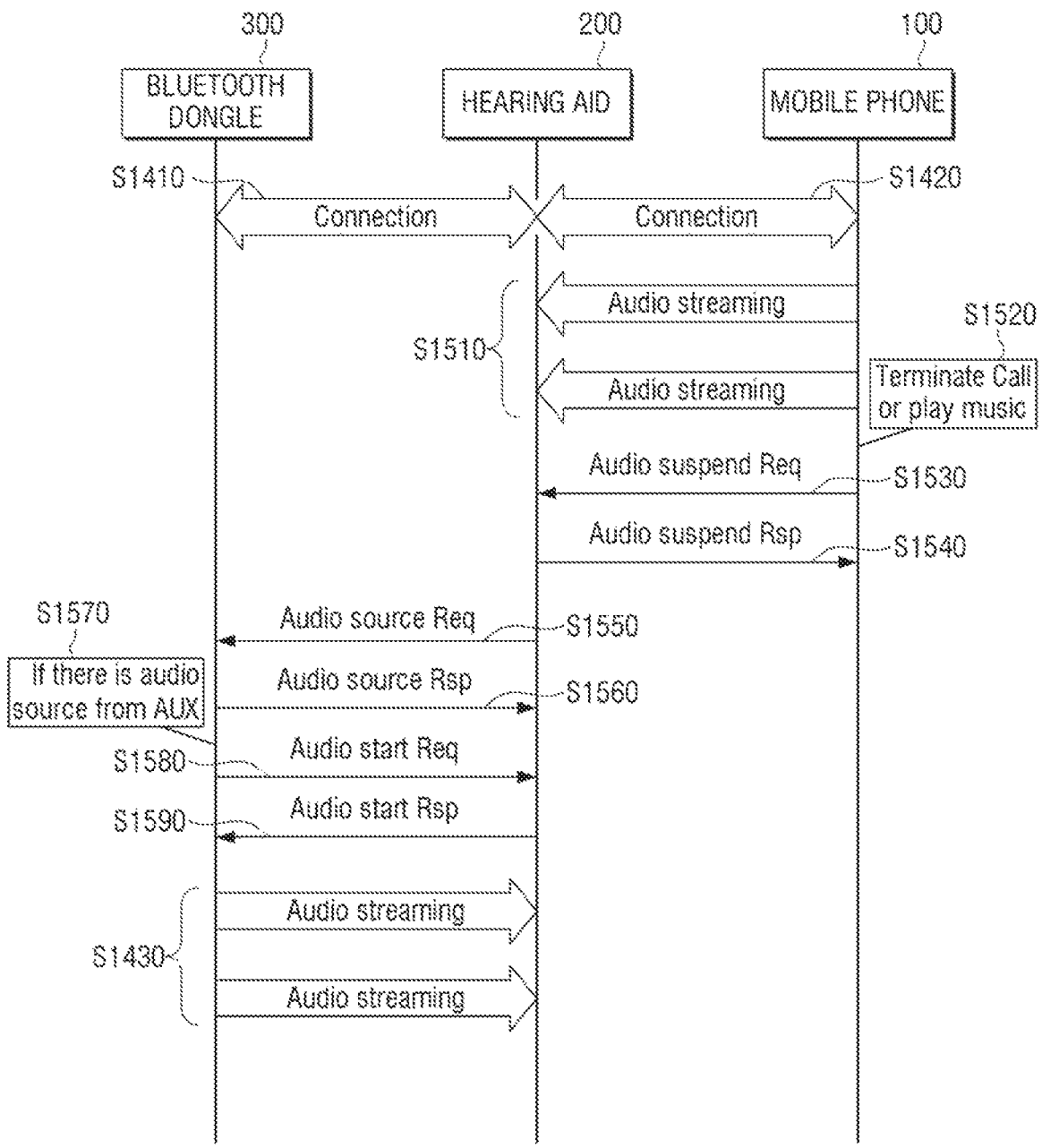
FIG. 15 is a sequence diagram provided to explain a method of returning to a previous source device after conversion according to an exemplary embodiment of FIG. 14.

FIG. 15 is a sequence diagram provided to explain a method of returning to a previous source device after the conversion according to the exemplary embodiment of FIG. 14.

Referring to FIG. 15, the mobile phone 100 and the hearing aid 200 are connected to each other through the first communication illustrated in FIG. 14 (S1420). Furthermore, the hearing aid 200 and the Bluetooth dongle 300 is connected to each other through the third communication illustrated in FIG. 14 (S1410). Moreover, the mobile phone 100 is streaming data to the hearing aid 200 (S1510).

The mobile phone 100 senses occurrence of an event that a streaming operation is ended. Specifically, the mobile phone 100 senses an input of a user commanding an end of call or suspension of playing music (S1520). The mobile phone 100 transmits a signal for informing suspension of streaming (S1530), and receives a response signal informing that suspension is confirmed from the hearing aid 200 (S1540).

The hearing aid 200 transmits a signal informing that an output of streaming is ended to at least one of source devices connected through communication (S1550). That is, the hearing aid 200 informs an end of streaming of the mobile phone 100 to the Bluetooth dongle 300 connected through the communication, and receives a response signal informing that the end of streaming is confirmed (S1560).

If the Bluetooth dongle 300 finds that an audio source which may be streamed by itself is still being received in an AUX terminal, the Bluetooth dongle 300 transmits a signal for requesting a start of streaming to the hearing aid 200 (S1580). In response to receiving a response signal informing that it is available to perform streaming from the hearing aid 200, the Bluetooth dongle 300 resumes the suspended streaming operation (S1430).

According to the second exemplary embodiment as the above, unlike the first exemplary embodiment, a source device performing communication may be converted into another source device without being provided with a user interface even if communication is not connected between a plurality of source devices.

FIG. 16 is a flowchart provided to explain a control method of an electronic apparatus according to another exemplary embodiment.

Referring to FIG. 16, an output device is outputting data of another source device when beginning an operation. Furthermore, the electronic apparatus is connected to the output device through communication.

At first, Communication is established with an output device (S1610). Specifically, the electronic apparatus exchanges a signal for establishing communication with the output device, and may be connected to the output device through communication.

Then, in response to occurrence of a preset event, the electronic apparatus transmits a signal for occupying the output device to at least one of the output device and other source devices (S1620). Specifically, if an event that the electronic apparatus have to stream its data to the electronic device, the electronic apparatus may transmit a signal for requesting a reception of streaming to the output device in order to suspend streaming of other source devices in the output device, or may directly transmit a signal for requesting suspension of streaming to other source devices.

In addition, if the streaming in other source devices is suspended in response to the signal received from the step of S1620, the electronic apparatus streams data to the output device (S1630).

Although it is not illustrated in the drawings, the above process is followed by steps that, if an event that streaming of the electronic apparatus is ended, the electronic apparatus transmits a signal informing an end of occupation of the output device to at least one of the output device and other source devices. Furthermore, other source devices which find a resource capable of being output in the output device may stream data to the output device.

According to the above-described methods, a source device for transmitting data to an output device may be changed without a user's manipulation through a user interface.

Meanwhile, all the components in the above exemplary embodiment are combined as one, or are operated by being combined together. However, this is only an example. For example, according to the exemplary embodiments, all the components may be operated by being selectively combined with one or more components. Furthermore, all the components may be implemented not only as an independent hardware, respectively, but also as a computer program having a program module for performing a part or a whole function combined in one or a plurality of hardware by selectively combined a part or a whole components, respectively. Codes and code segments constituting of the computer program may be easily derived by a person having ordinary skill in the art. The computer program may be stored in a non-transitory computer readable media to be read and executed by a computer, so that the exemplary embodiments may be implemented.

The non-transitory recordable medium refers to a medium which may store data semi-permanently rather than storing data for a short time such as a register, a cache, and a memory and may be readable by an apparatus. Specifically, the above-mentioned various applications or programs may be stored in a non-temporal recordable medium such as CD, DVD, hard disk, Blu-ray disk, USB, memory card, and ROM.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. An electronic apparatus comprising:
    a display;
    a transceiver configured to communicate with a first device; and
    a processor configured to:
        in response to receiving a broadcasted advertising signal from a second device, transmit a scan request signal to the first device,
        in response to receiving a result of a scan corresponding to the scan request signal from the first device, display, on the display, identification information included in the broadcasted advertising signal based on the result of the scan, the identification information including identification information of the second device, and
        in response to a user command to select the identification information of the second device included in the displayed identification information, control the transceiver to transmit information for establishing communication between the first device and the second device to the first device,
    wherein the result of the scan received from the first device comprises a result of detecting the broadcasted advertising signal from the second device.

2. The apparatus as claimed in claim 1, wherein the processor is further configured to:
    in response to the user command to select the identification information of the second device:
    establish communication with the second device,
    transmit address information of the first device used in establishing communication with the first device to the second device, and
    transmit address information of the second device used in establishing communication with the second device to the first device.

3. The apparatus as claimed in claim 1, wherein the processor is further configured to:
    display identification information regarding at least one device detected by the first device based on the received result of the scan.

4. The apparatus as claimed in claim 1, wherein the processor is further configured to:
    display the identification information included in the broadcasted advertising signal detected as a result of a scan, and
    in response to the user command to select the identification information of the second device included in the displayed identification information, transmit a connection request signal for instructing an establishment of communication with the second device to the first device by using address information received from the second device.

5. The apparatus as claimed in claim 1, the apparatus further comprising:
    an NFC module configured to receive address information of the second device to establish communication with the second device located within a preset area,
    wherein the processor is further configured to transmit a connection request signal for instructing an establishment of communication with the second device by using the address information received by the NFC module from the second device to the first device.

6. The apparatus as claimed in claim 1, further comprising an NFC module configured to transmit address information of the first device to establish communication with the second device located within a preset area so that the second device establishes communication with the first device.

7. The apparatus as claimed in claim 1, wherein:
    the first device outputs streaming data received from the second device,
    the transceiver communicates with the second device, and
    the processor is further configured to, in response to occurrence of a preset event, transmit a suspension request signal for requesting suspension of streaming to the second device, and in response to streaming of the second device being suspended, stream data to the first device.

8. The apparatus as claimed in claim 7, wherein the processor is further configured to, in response to occurrence of an event that streaming of the electronic apparatus is suspended, transmit a signal informing suspension of streaming to the first device, and transmits a streaming start command signal to the second device so as to resume streaming of the second device.

9. The apparatus as claimed in claim 1, wherein:
    the first device outputs streaming data received from the second device,
    the transceiver is further configured to communicate with the second device, and
    the processor is further configured to:
        in response to occurrence of a preset event, transmit a signal informing a start of streaming to the first device, and
        when the first device suspends streaming of the second device in response to the signal informing a start of streaming, stream data to the first device.

10. The apparatus as claimed in claim 9, wherein the processor is further configured to, in response to occurrence of an event that streaming of the electronic apparatus is suspended, transmit a signal informing suspension of streaming to the first device so that the first device outputs streaming of the second device.

11. A controlling method of an electronic apparatus having a display, the method comprising:
    establishing communication with a first device;

in response to receiving a broadcasted advertising signal from a second device, transmitting a scan request signal to the first device;

in response to receiving a result of a scan corresponding to the scan request signal from the first device, displaying, on the display, identification information included in the broadcasted advertising signal based on the result of the scan, the identification information including identification information of the second device; and in response to a user command to select the identification information of the second device from the displayed identification information, transmitting information for establishing communication between the first device and the second device to the first device wherein the result of the scan received from the first device comprises a result of detecting the broadcasted advertising signal from the second device.

12. The method as claimed in 11, the method further comprising:

in response to the user command to select the identification information of the second device, establishing communication with the second device, transmitting address information of the first device used in establishing communication with the first device to the second device; and transmitting address information of the second device used in establishing communication with the second device to the first device.

13. The method as claimed in 11, wherein the displaying comprises displaying identification information regarding at least one device detected by the first device based on the received result of the scan.

14. The method as claimed in 11, wherein the displaying comprises:

scanning to detect the broadcasted advertising signal, displaying the identification information included in the broadcasted advertising signal detected as a result of a scan, wherein the transmitting comprises:

in response to the user command to select the identification information of the second device included in the displayed identification information, transmitting a connection request signal for instructing an establishment of communication with the second device to the first device by using address information received from the second device.

15. The method as claimed in 11, the method further comprising:

receiving address information of the second device from the second device located within a preset area to establish communication, transmitting a connection request signal for instructing an establishment of communication with the second device by using the address information received from the second device to the first device.

16. The method as claimed in 11, the method further comprising:

transmitting address information of the first device for establishing communication to the second device located within a preset area so that the second device establishes communication with the first device.

17. The method as claimed in 11, the method further comprising:

while the first device outputs streaming data received from the second device:

establishing communication with the second device;

in response to occurrence of a preset event, transmitting a signal requesting suspension of streaming to the second device; and in response to streaming of the second device being suspended, streaming data to the first device.

18. The method as claimed in 17, the method further comprising:

in response to occurrence of an event that streaming of the electronic apparatus is suspended, transmitting a signal informing suspension of streaming to the first device;

transmitting a streaming start command signal to the second device so as to resume streaming of the second device.

19. The method as claimed in 11, wherein:

the first device outputs streaming data received from the second device, and the method further comprises:

establishing communication with the second device;

in response to occurrence of a preset event, transmitting a signal informing a resume of streaming to the first device; and when the first device suspends streaming of the second device in response to the signal informing a resume of streaming, streaming data to the first device.

20. The method as claimed in 19, the method further comprising:

in response to occurrence of an event that streaming of the electronic apparatus is suspended, transmitting a signal informing suspension of streaming to the first device so that the first device may output the streaming of the second device.

* * * * *